March 18, 1958  K. S. HARRIS  2,826,807
OIL PAN GUIDE AND SUPPORT ASSEMBLY
Filed May 17, 1954
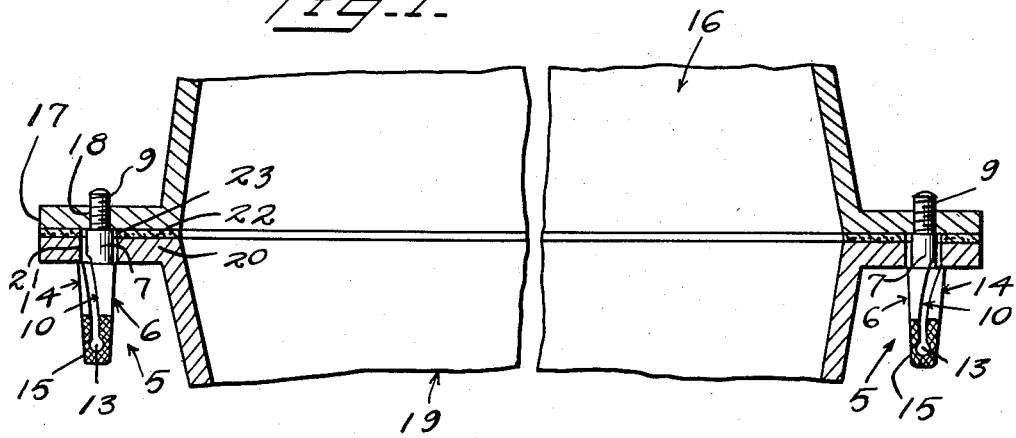
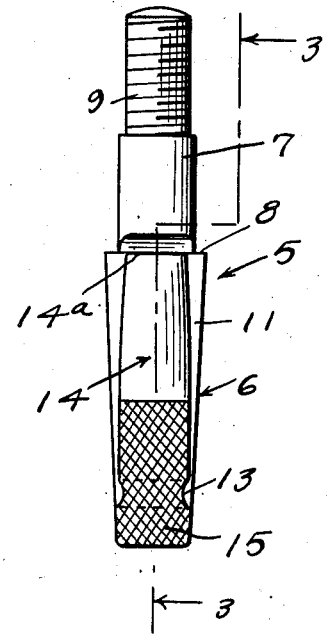
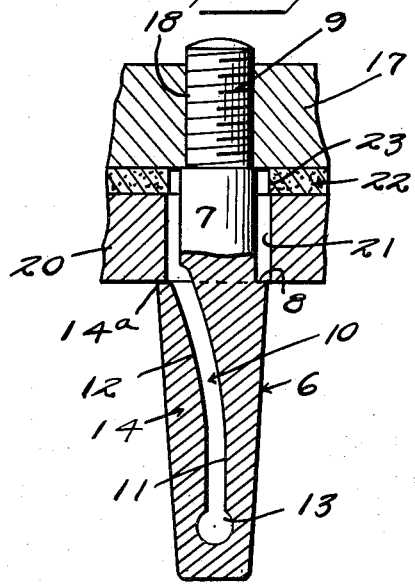
INVENTOR
K. S. Harris
BY John N. Randolph
ATTORNEY United States Patent Office 2,826,807
Patented Mar. 18, 1958

2,826,807

OIL PAN GUIDE AND SUPPORT ASSEMBLY

Kelse S. Harris, Fall River, Mass.

Application May 17, 1954, Serial No. 430,371

4 Claims. (Cl. 29—271)

This invention relates to a novel oil pan guide and support assembly for use in guiding an oil pan into a correct position against the bottom of the block of an internal-combustion engine and for temporarily supporting the oil pan correctly positioned while the retaining screws are applied by means of which the oil pan is supported beneath the engine block.

Considerable difficulty is ordinarily encountered in correctly positioning an oil pan and gasket so that the fastening receiving openings of the oil pan and gasket will align with the fastening receiving openings of the bottom of an internal-combustion engine block, so that the screw fastenings utilized to retain the pan beneath the engine block may be applied. As it is substantially impossible for one mechanic to hold the pan so that the pan openings and gasket openings will align with the engine block openings and thereafter to apply the fastenings, this operation is usually accomplished by two mechanics one of whom supports the pan and gasket properly positioned while the other applies the fastenings.

Accordingly, it is a primary object of the present invention to provide a guide and supporting assembly or unit which may be readily applied to selected threaded fastening receiving openings in the bottom of the engine block and which will function for guiding the gasket and oil pan to proper positions with the openings thereof aligned with the block openings and for supporting the parts thus positioned beneath the engine block while being secured by headed screw fastenings applied through other of the aligned openings of the engine block, gasket and oil pan.

Still a further object of the invention is to provide a pan guide and support assembly formed of a one piece construction which will very effectively function for accomplishing its intended result.

Various other objects and advantages of the invention will hereinafter become more fully apparent from the following description of the drawing, illustrating a presently preferred embodiment thereof, and wherein:

Figure 1 is a cross sectional view through a bottom portion of an engine block and an upper portion of an oil pan, showing the oil pan and a gasket supported against the bottom of the engine block by two of the guide and support units;

Figure 2 is an enlarged side elevational view of one of the guide and support units shown removed and as the left-hand unit of Figure 1 would appear if viewed from left to right of Figure 1, and Figure 3 is a vertical sectional view, partly in side elevation taken substantially along a plane as indicated by the line 3—3 of Figure 2, and showing the unit as it would appear in an applied position and supporting an oil pan.

Referring more specifically to the drawing, the oil pan guide and support unit in its entirety and comprising the invention is designated generally 5 and constitutes an elongated member of one piece construction. The member 5 includes a head, designated generally 6, which is relatively long in a direction axially of the member 5. The head 6 is substantially circular in cross section and tapers in diameter from an inner toward an outer end thereof. The member 5 includes a shank 7 forming an extension of the enlarged inner end of the head 6. The shank 7 is preferably of circular cross section and of uniform diameter from end-to-end thereof. The diameter of the shank 7 is somewhat less than the diameter of the enlarged inner end of the head 6, so that the inner end of the head 6 defines a shoulder 8 around the end of the shank 7 which projects therefrom. The member 5 also includes a threaded stem 9 forming an extension at the outer end of the shank 7. The outer diameter of the threaded stem 9 is slightly less than the diameter of the shank 7. The head 6, shank 7 and stem 9 are coaxially disposed.

The head 6 is provided with an elongated slot 10 which extends longitudinally thereof and which is formed by the cutting out of a substantial portion of the material forming the head 6 so that a substantial space exists between the two oppositely disposed walls 11 and 12 of said slot. The upper end of the slot 10 opens outwardly of the member 5 through a portion of the shoulder 8 and an adjacent part of the shank 7, as best seen in Figure 3. The head 6 is provided with a bore 13 which extends diametrically therethrough, near the lower restricted end of said head and into which the opposite end of the slot 10 opens. The slot 10 forms a resilient elongated head section 14, constituting a part of the head 6, which extends longitudinally thereof and which is disposed between the outer slot wall 12 and a peripheral portion of the head 6 which constitutes less than one half of the head 6 in cross section. The thickness of the resilient head portion 14 is reduced at the lower end thereof by a part of the bore 13, as seen in Figure 3, and which constitutes the secured end of said head portion 14.

The member 5 is formed of a material such that the portion 14 of the head 6 is resilient and is capable of being displaced by a compressing force inwardly with respect to the axis of the head by a restriction of the thickness of the slot 10. In cutting out the slot 10 to form the substantial space as illustrated between the slot walls 11 and 12, the upper part 14a of the head portion 14 is bent away from the axis of the head so that said upper part 14a is located a greater distance from the axis of the head 6 than the remainder of the upper end of the head. This is clearly illustrated in Figures 2 and 3 wherein it will be noted that the radius of the head measured from the axis thereof to the outer side of the portion 14a is greater than the radius of the head at its upper end, measured in the opposite direction to the right-hand side of the upper portion thereof as seen in Figure 3. Likewise, the radius of the head 6 at its upper end as seen in Figure 2 is less than the radius as seen in Figure 3 from the axis of the head to the outer surface of the portion 14a. However, when the portion 14 is forced inwardly, as previously described, the distance between the axis of the head and the outer surface of the portion 14a is no greater than the radius of the remainder of the upper end of the head 6, constituting the head portion located to the right of the slot wall 11, as seen in Figure 3.

For the purpose of illustrating one application and use of the combination guide and support unit 5, a bottom portion of the cylinder block 16 of an internal-combustion engine is illustrated in Figure 1 having an outturned bottom flange 17 provided with threaded openings 18. A fragmentary top portion of a conventional oil pan 19 is also illustrated in Figure 1 having an outturned flange 20 at its upper edge in which is provided openings 21 which are larger in diameter than the threaded openings 18. A conventional gasket 22 is also illustrated in part in Figure 1 having openings 23 arranged to register with the openings 21 and which are substantially of the same diameter.

Preferably two of the guide and support units 5 are utilized for applying the oil pan 19 and gasket 22 to the flanged bottom of the cylinder block 16, assuming that the oil pan and gasket are removed therefrom. The threaded stems 9 of the two units 5 are screwed upwardly into two of the threaded openings 18 which are preferably located on opposite sides of the cylinder block 16, until the ends of the shanks 7, from which the stems 9 project, abut against the underside of the flange 17. A knurled head portion 15 affords a finger grip enabling the unit 5 to be thus applied to the flange 17 without the use of a tool. The gasket 22 is then placed on the flange 20 so that its openings 23 will register with the openings 21. The pan is then displaced upwardly so that the aligned openings 21 and 23 which normally register with the threaded openings 18 engaged by the stems 9 can pass upwardly around the heads 6 of the units 5. As the gasket 22 and flange 20 approach the flange 17, the resilient head portions 14 will be forced inwardly to restrict the slots 10 for reducing the cross sectional size of the upper portions of the heads 6, by engagement of the walls of the openings 23 and 21 with the upper free end portions 14a of said resilient head parts 14. If preferred, this can be accomplished by gripping the heads 6 beneath the flange 20 for displacing the resilient portions 14 inwardly, so that the openings 23 and 21 will slide freely over the enlarged upper ends of the heads 6. The shanks 7 are of a proper length so that when the gasket 22 is seated tightly between the flanges 17 and 20, the underside of the flange 20 will be disposed above the shoulders 8 of the heads 6. Assuming that the portions 14 are no longer gripped and held displaced inwardly, it will be readily apparent that said resilient portions 14 will spring back to their normal positions as illustrated in Figures 1 and 3 so that the upper ends thereof will engage under portions of the flange 20 for supporting said flange and the gasket 22 properly positioned beneath the flange 17 and with all of the openings 21 and 23 of the flange 20 and gasket 22, respectively, aligning with openings 18 of the flange 17. With the pan 19 thus supported by the two guide and support units 5, a mechanic may utilize both hands in applying the conventional headed bolts or cap screws, not shown, to the remaining aligned openings 18, 23, 21. Thereafter, the two units 5 are removed by manually gripping and turning said units in the opposite direction for unscrewing the stems 9 from the openings 18, after which conventional cap screws or headed bolts are applied to the openings previously engaged by the portion 7 and 9 of said units 5.

It will be understood that the size of the parts have been exaggerated in the drawing to illustrate details.

The radius of the upper end of the head 6 at the right of the slot wall 11, as seen in Figure 3, is less than the radius of the openings 21 and 23, so that the head portion 6, as seen in Figure 2, which is disposed behind the resilient portion 14 thereof, will pass unobstructed through the openings 21 and 23. It will likewise be obvious that the part 14a of the head may pass through said openings 21 and 23 when the portion 14 is displaced inwardly of the axis of the head. However, when the portion 14 is released and is spring biased outwardly to its normal position, the upper end of the part 14a will be spaced from the axis of the head 6 a distance greater than the radius of the openings 21 and 23. Also the diameter of the upper end of the head 6 as measured between the portion 14a and the head portion located directly opposite thereto is greater than the diameter of the openings 21 and 23, as seen in Figure 3.

Said member 5 may be formed of any suitable material such as various metals or plastic possessing sufficient resiliency to enable the head part 14 to be pressed inwardly and be spring biased back to its normal position as illustrated in the drawing.

Various modifications and changes are contemplated and may obviously be resorted to, without departing from the spirit or scope of the invention as hereinafter defined by the appended claims.

I claim as my invention:

1. A combination guide and support of the character described comprising an elongated member of one piece construction, an elongated head constituting one end of said member, said head being of substantially circular cross section and being tapered toward an outer distal end thereof, a threaded stem constituting the opposite end of said member, and an unthreaded shank portion extending between an inner end of said stem and the enlarged inner end of said head, said shank portion being of circular cross section and of smaller diameter than the enlarged inner end of the head and of larger diameter than said threaded stem; said head having an elongated slot purovided with a closed end located near the outer end of the head and an opposite end opening outwardly of said member between a portion of the inner end of the head and an adjacent portion of said shank, said slot having side portions opening outwardly of the head from end-to-end thereof and being longitudinally curved whereby the open portion of the slot is disposed on one side of the axis of the head, said slot forming opposed slot walls spaced a substantial distance apart including an inner slot wall and an outer slot wall, an inner portion of said outer slot wall being spaced a greater distance from the axis of the head than an inner portion of the inner slot wall, said outer slot wall combining with a surrounding peripheral portion of the head to form an elongated head portion having an inner free end and an outer secured end, said peripheral portion being substantially straight from end-to-end of the head portion, said head portion being yieldable inwardly toward the inner slot wall for positioning the inner end thereof as near to the axis of the head as the remainder of the inner end of said head, said inner free end of said head portion being normally spring biased outwardly to normally assume a position at a greater distance from the axis of the head than the remainder of the inner end of said head.

2. A combination guide and support unit as in claim 1, said slot having an enlarged lower end for reducing the thickness of said resilient head portion at the secured end thereof.

3. A combination guide and support of the character described comprising an elongated member of one piece construction, an elongated head constituting one end of said member, said head being of substantially circular cross section and being tapered toward an outer distal end thereof, a threaded stem constituting the opposite end of said member, and an unthreaded shank portion extending between an inner end of said stem and the enlarged inner end of said head, said shank portion being of circular cross section and of smaller diameter than the enlarged inner end of the head and of larger diameter than said threaded stem; said head being longitudinally slotted to provide a major head portion and a minor head portion, said minor head portion having a secured end located adjacent the outer end of the head and having an unsecured opposite free end forming a part of the inner end of the head, said minor head portion being resiliently disposed relatively to the major head portion for yielding movement of the free end thereof inwardly toward the axis of the head and to a position at a distance from the axis of the head no greater than the radius of the inner end of the major head portion, said minor head portion being normally spring biased outwardly whereby the free end thereof is spaced a greater distance from the axis of the head than the radius of the inner end of the major head portion, the exterior surface of the minor head portion being substantially straight from end-to-end thereof when said minor head portion is spring biased outwardly.

4. A combination guide and support of the character described comprising an elongated member of one piece construction, an elongated head constituting one end of said member, said head being of substantially circular cross section and being tapered toward an outer distal end thereof, a threaded stem constituting the opposite end of said member, and an unthreaded shank portion extending between an inner end of said stem and the enlarged inner end of said head, said shank portion being of circular cross section and of smaller diameter than the enlarged inner end of the head and of larger diameter than said threaded stem; said head being slotted longitudinally from its inner end to adjacent its outer end to provide a resilient head portion having an unsecured end constituting a part of the inner enlarged end of the head and normally disposed at a greater distance from the axis of the inner end of the head than the remainder of the inner end of said head, said resilient head portion being spaced from the remainder of the head from end-to-end thereof and being yieldably displaceable inwardly from a normal position thereof toward the axis of the head for positioning the inner free end thereof at a distance from the axis of the head no greater than the radius of the remainder of the inner end of the head, the exterior of said resilient head portion being substantially straight longitudinally in a normal position thereof.

References Cited in the file of this patent

UNITED STATES PATENTS

| | | |
|---|---|---|
| 650,395 | Jenkins | May 29, 1900 |
| 1,921,379 | Bailey | Aug. 8, 1933 |
| 2,572,502 | Maxwell | Oct. 23, 1951 |